C. B. SCHOENMEHL.
PRIMARY BATTERY.
APPLICATION FILED FEB. 4, 1910.

987,647.

Patented Mar. 21, 1911.
2 SHEETS—SHEET 1.

Witnesses

Inventor
Charles B. Schoenmehl
By Chamberlain & Newman
Attorneys

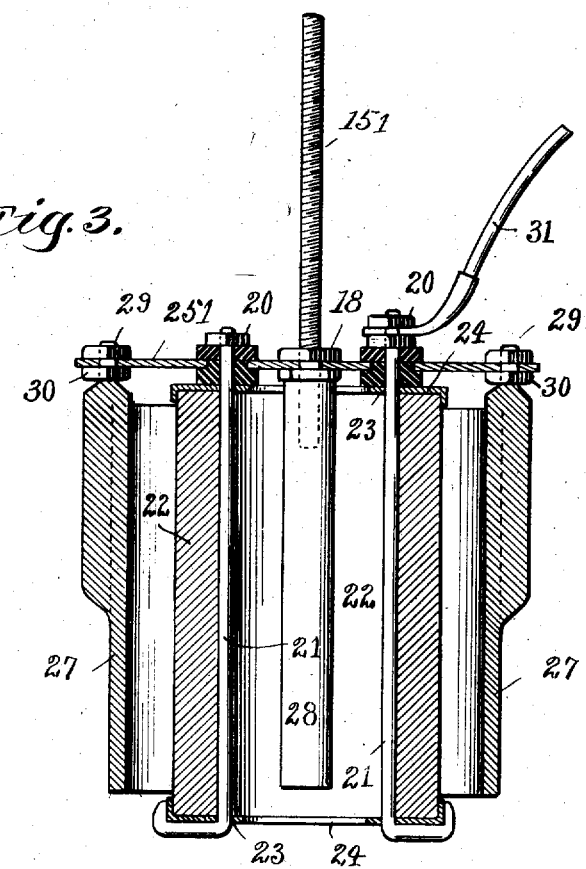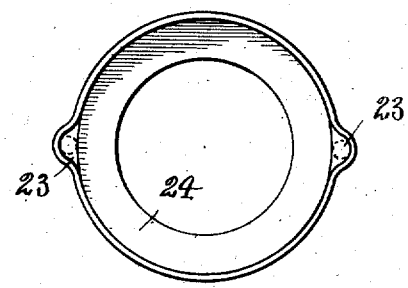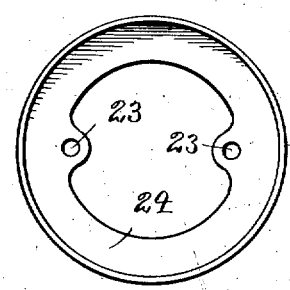

UNITED STATES PATENT OFFICE.

CHARLES B. SCHOENMEHL, OF WATERBURY, CONNECTICUT.

PRIMARY BATTERY.

987,647.  Specification of Letters Patent.  Patented Mar. 21, 1911.

Application filed February 4, 1910. Serial No. 542,063.

*To all whom it may concern:*

Be it known that I, CHARLES B. SCHOENMEHL, a citizen of the United States, and resident of Waterbury, in the county of New Haven and State of Connecticut, have invented certain new and useful Improvements in Primary Batteries, of which the following is a specification.

My invention relates to new and useful improvements in primary batteries employing circular or annular forms of positive and negative elements and particularly to the construction and arrangement of such elements and means for supporting the same within the jar by a single rod.

It is the object of my invention to provide a battery of this class which will be more efficient than those now in use by reason of its novel construction whereby a larger area of the annular negative element is made available; further to provide a novel form of connection intermediate of the said elements whereby the same may be suspended by a single rod from the cover of a battery jar.

The several parts of my battery including both the positive and negative elements are so connected and supported as to be capable of suspension from the cover of a jar by a single rod, and adapted to be attached to or detached from said cover by a single nut which permits the battery to be removed very quickly and conveniently.

The foregoing form of construction constitutes what is now known in the trade as an assembled element and while more or less common in the plate forms of elements has not to my knowledge been produced with cylindrical or annular forms of solidified elements. In this connection I have also produced a construction which will permit of either the positive or negative connection for the battery being made through the said central supporting rod and likewise for the opposite connection being made through a wire for connection with the opposed element.

Figure 1:
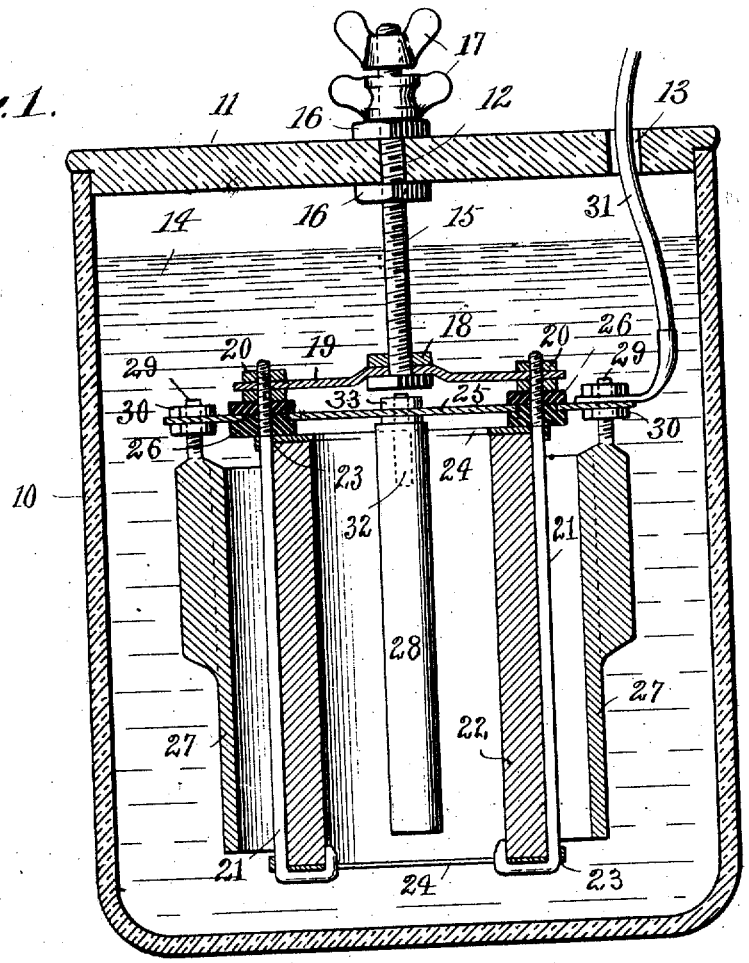
Figure 2:
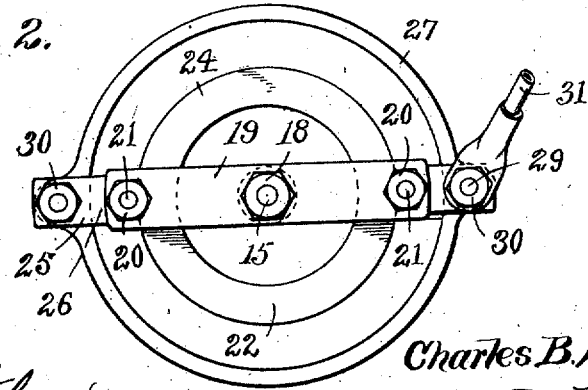

Upon the accompanying two sheets of drawings forming a part of this specification similar characters of reference denote like or corresponding parts throughout the several figures and of which, Figure 1, shows a central vertical sectional view through one form of my improved battery complete. Fig. 2, is a detached plan view of the elements of battery shown in Fig. 1. Fig. 3, is a central, vertical sectional view through the said elements but connected in a slightly different manner and whereby the central rod connection represents the pole for the positive elements while the wire is connected with the negative element. Fig. 4, is a plan view of the end caps 24 shown in Figs. 1 and 2 for supporting the negative element, and Fig. 5, is a plan view of the end caps 24' shown in Fig. 3. for supporting the same element.

Referring in detail to the characters of reference marked upon the drawings 10 indicates a jar, 11 its cover, and 12 and 13 holes in the cover through which connections are had with the elements of the battery and by means of which said elements are suspended within the solution 14 from the cover.

15 represents a threaded suspension rod or hanger which is designed to be passed through the central hole 12 of the cover and secured thereto by nuts 16 and is further provided with binding nuts 17 whereby a field wire, not shown, may be attached for connection to the one side of the battery. The lower end of this rod is headed while the adjoining threaded end portion is provided with a nut 18 intermediate of which and the said head, is secured a bridge strip 19 the opposite end portions of which are connected by means of nuts 20 with vertically disposed wires 21 which extend down along the side of the cylindrical compressed negative element 22 and passed through holes 23 in the end caps 24 arranged over the opposite ends of the said negative elements. The cylindrical negative electrode is preferably composed of oxid of copper scale which is first finely ground and then pressed into form and baked to form a solidified mass, while the positive electrodes are formed of zinc which may be either rolled and bent into form, or molded as preferred.

The lower portion of this wire is disposed across and up to better engage the lower end of the cap and element in a way to support the same from the bridge piece 19 before mentioned. A second cross piece 25 is arranged beneath the before mentioned bridge 19 and supported therefrom through the medium of the said wires 21 and insulating washers 26 arranged around the wires and within and around holes in the cross piece 25 and serves to support the two positive elements 27 and 28 around and within the said negative element 22. The first named positive element 27 is of a cylindrical form provided with upwardly disposed ends 29 that pass through holes in the cross piece 25 and are secured thereto by nuts 30 which may also serve for the attachment of the before mentioned connecting wire 31. A further hole is formed in the central portion of the cross piece immediately below the suspension rod 15 and serves for the attachment of the second positive electrode 28 through the medium of the stud 32 and nuts 33.

From the foregoing construction it will be seen that the positive and negative elements are positively insulated one from the other and are provided with a separate field connection, at the same time they are all suspended from a single and centrally disposed suspension rod. The particular arrangement of the elements with relation to each other, namely, one positive element surrounding the cylindrical negative element and a second positive element disposed centrally within said cylindrical negative element, obviously insures a more ready action or attack upon both sides of the cylindrical negative element thus insuring a battery of higher efficiency than if it operated upon the one side only.

In Fig. 3, I have shown a construction wherein the same principle is applied, though the connections for the field wires are reversed, that is, the positive elements are electrically connected with the suspending rod 151 while the field wire 31 is connected with the negative element. In doing this I dispense with the bridge 19 and pass the rod 151 through and attach it to the cross piece 251 in a way to also form a connection for the zinc element 28, the upper end of which is tapped to threadably engage the lower extremity of the said suspending rod. The negative element 22 is insulatively connected with and supported from the cross piece 251 through the medium of the wires 21 and nuts 20. The field wire 31 which in this case forms the positive pole is connected through the said wire with the negative electrode and the rod 15 forms the negative pole for the positive elements.

Having thus described my invention what I claim and desire to secure by Letters Patent is:—

1. The combination of a compressed cylindrical oxid of copper negative electrode, a cylindrical zinc positive electrode surrounding the negative electrode, a second zinc positive electrode within the said cylindrical negative electrode, means for operatively connecting the three electrodes together, a single suspending rod for hanging the said assembled elements from the cover of a jar.

2. The combination of a compressed cylindrical oxid of copper negative electrode, a zinc positive electrode surrounding the negative electrode, a second positive zinc electrode within the said cylindrical negative electrode, means for electrically connecting and supporting the two positive electrodes, and a single suspending rod attached to said supporting means whereby they may be both hung from the cover of a jar.

3. The combination of a compressed oxid of copper negative electrode, a cylindrical zinc positive electrode surrounding the negative electrode, a second zinc positive electrode within the said cylindrical negative electrode, and means insulating and retaining the several electrodes in their respective positions, and means for supporting the three electrodes from a single rod attached to the cover of a jar.

4. The combination of a compressed oxid of copper negative electrode, a cylindrical zinc positive electrode surrounding the negative electrode, a second zinc positive electrode within the said cylindrical negative electrode, a cross piece for electrically connecting the positive electrodes together, means for insulatively supporting the negative electrode from said cross piece, and a single suspending rod connected with the cross piece for hanging the assembled electrodes from a jar cover.

5. The combination of a compressed oxid of copper negative electrode, a cylindrical zinc positive electrode surrounding the negative electrode, a second zinc positive electrode within the said cylindrical positive electrode, means for connecting the three electrodes together and electrically connecting the two positive electrodes, a single rod for supporting the assembled elements from a cover and for forming one pole of the battery.

6. The combination of a cylindrical negative element a positive element surrounding, and a positive element within the negative element, a cross strip connecting the three elements, the said negative elements being insulated from the positive element, a single rod connected with the cross piece for supporting the three elements from a cover and forming one pole for the battery.

7. The combination of a cylindrical negative element, positive elements upon both the inside and outside of said negative element, a cross piece connecting the three elements but insulated from the negative element, a second cross piece for connecting and supporting the two sides of the said negative element, and a single rod attached to said second cross piece for supporting the assembled elements from a jar cover.

8. The combination of a cylindrical negative element, a positive element upon both the inside and outside of said negative element, a cross piece connecting the three elements, wires insulatively connected to the cross piece and disposed down along and inside of and around the ends of the negative elements to support the same, and a single separate rod connected with the cross piece to support the assembled element from the cover of a jar.

9. The combination of a cylindrical negative element, a positive element surrounding the negative element, a second positive element within the negative element, a cross piece electrically connecting the two positive elements, a second cross piece insulated from the first named cross piece, means for supporting the negative elements from the said second cross piece, and a single suspending rod for supporting the assembled elements from the cover of a jar.

Signed at Bridgeport in the county of Fairfield and State of Connecticut this 2nd day of February, A. D., 1910.

CHARLES B. SCHOENMEHL.

Witnesses:
C. M. NEWMAN,
EMMA J. NEWMAN.